(12) United States Patent
Hou et al.

(10) Patent No.: US 10,154,026 B2
(45) Date of Patent: Dec. 11, 2018

(54) SECURE REMOTE MODIFICATION OF DEVICE CREDENTIALS USING DEVICE-GENERATED CREDENTIALS

(71) Applicant: Microsoft Technology Licensing, LLC, Redmond, WA (US)

(72) Inventors: Justin Alexander Hou, Seattle, WA (US); Christopher William Thilgen, Bellevue, WA (US); Vladimir Holostov, Sammamish, WA (US); Roy Williams, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/161,188

(22) Filed: Jan. 22, 2014

(65) Prior Publication Data

US 2015/0106893 A1 Apr. 16, 2015

Related U.S. Application Data

(60) Provisional application No. 61/891,334, filed on Oct. 15, 2013.

(51) Int. Cl.
*H04L 29/06* (2006.01)
*G06F 21/31* (2013.01)
(Continued)

(52) U.S. Cl.
CPC .......... *H04L 63/083* (2013.01); *G06F 21/305* (2013.01); *G06F 21/46* (2013.01);
(Continued)

(58) Field of Classification Search
CPC ....... H04L 63/083; H04L 63/20; H04L 63/08; H04L 63/102; H04L 9/3226;
(Continued)

(56) References Cited

U.S. PATENT DOCUMENTS 7,353,536 B1 * 4/2008 Morris et al. .................... 726/6
7,849,320 B2 * 12/2010 Raikar et al. ................. 713/182
(Continued)

FOREIGN PATENT DOCUMENTS

| CN | 103246841 A | 8/2013 |
| JP | H11212922 A | 8/1999 |
| WO | 2013097887 A1 | 7/2013 |

OTHER PUBLICATIONS

Expiring password at the user level, published in http://help.globalscape.com/help/eft6-2/mergedprojects/eft/expiring_passwords_at_the_user_level.htm, Aug. 18, 2011, 3 pages.*
(Continued)

*Primary Examiner* — Catherine B Thiaw
(74) *Attorney, Agent, or Firm* — Fiala & Weaver P.L.L.C.

(57) ABSTRACT

Methods, systems, and computer program products are provided that enable secure remote modification of device credentials using device-generated credentials. A plurality of credentials policies is stored by the user device. The credentials policies are merged to generate a merged credentials policy. An instruction is received by the user device from a trusted service to initiate a device credentials change. A new device credentials is generated on the user device based at least on the merged credentials policy.

20 Claims, 6 Drawing Sheets

(51) Int. Cl.
*G06F 21/30* (2013.01)
*G06F 21/46* (2013.01)
*G06F 21/73* (2013.01)
*H04L 9/08* (2006.01)
*H04L 9/32* (2006.01)

(52) U.S. Cl.
CPC .............. *G06F 21/73* (2013.01); *H04L 9/088* (2013.01); *H04L 9/0891* (2013.01); *H04L 9/3263* (2013.01)

(58) Field of Classification Search
CPC ............. H04L 63/0884; H04L 63/0263; H04L 9/3263; H04L 9/088; H04L 9/0891; G06F 21/46; G06F 21/31; G06F 21/305; G06F 21/73
See application file for complete search history.

(56) References Cited

U.S. PATENT DOCUMENTS

| | | | |
|---|---|---|---|
| 8,200,582 B1 | 6/2012 | Zhu | |
| 8,296,827 B2 | 10/2012 | Paganetti et al. | |
| 8,397,077 B2* | 3/2013 | Hoey et al. | 713/184 |
| 8,413,222 B1 | 4/2013 | Cooley et al. | |
| 8,677,451 B1* | 3/2014 | Bhimaraju | H04L 63/083 726/2 |
| 8,739,261 B2* | 5/2014 | Chao | G06F 21/31 726/7 |
| 8,763,096 B1* | 6/2014 | Hernacki et al. | 726/5 |
| 8,869,305 B1* | 10/2014 | Huang | 726/29 |
| 9,106,426 B2* | 8/2015 | Schneider | G06F 21/31 |
| 9,519,777 B2* | 12/2016 | Brown | H04L 63/0884 |
| 2001/0056423 A1* | 12/2001 | Kanazawa | G06Q 30/02 |
| 2003/0093680 A1* | 5/2003 | Astley | G06F 21/445 713/183 |
| 2004/0199795 A1* | 10/2004 | Grewal | G06F 21/41 726/8 |
| 2004/0210767 A1* | 10/2004 | Sinclair | H04L 29/06 726/6 |
| 2004/0250141 A1* | 12/2004 | Casco-Arias et al. | 713/202 |
| 2004/0260953 A1* | 12/2004 | Jamieson | H04L 63/0815 726/6 |
| 2005/0027713 A1* | 2/2005 | Cameron et al. | 707/100 |
| 2006/0265740 A1* | 11/2006 | Clark | G06F 21/34 726/8 |
| 2007/0094716 A1* | 4/2007 | Farino et al. | 726/5 |
| 2007/0186106 A1* | 8/2007 | Ting et al. | 713/168 |
| 2008/0059804 A1* | 3/2008 | Shah | G06F 21/41 713/186 |
| 2008/0109365 A1* | 5/2008 | Kulkarni | G06F 21/31 705/55 |
| 2009/0019514 A1* | 1/2009 | Hazlewood | H04L 63/0281 726/1 |
| 2009/0019533 A1* | 1/2009 | Hazlewood et al. | 726/5 |
| 2009/0158406 A1* | 6/2009 | Jancula et al. | 726/5 |
| 2009/0178106 A1* | 7/2009 | Feng | H04L 63/083 726/1 |
| 2009/0210712 A1* | 8/2009 | Fort | H04L 63/1441 713/175 |
| 2009/0210934 A1* | 8/2009 | Innes | 726/7 |
| 2009/0320108 A1 | 12/2009 | Livingston et al. | |
| 2010/0154025 A1* | 6/2010 | Esteve Balducci et al. | 726/1 |
| 2010/0269156 A1 | 10/2010 | Hohlfeld et al. | |
| 2011/0029782 A1* | 2/2011 | Havercan | 713/183 |
| 2012/0023554 A1* | 1/2012 | Murgia et al. | 726/4 |
| 2013/0055366 A1 | 2/2013 | Chao et al. | |
| 2013/0080765 A1* | 3/2013 | Mohanty et al. | 713/150 |
| 2013/0081101 A1* | 3/2013 | Baer | G06F 21/577 726/1 |
| 2013/0205360 A1* | 8/2013 | Novak | H04L 63/102 726/1 |
| 2013/0212657 A1 | 8/2013 | Lu | |
| 2013/0227637 A1* | 8/2013 | Nagarajan et al. | 726/1 |
| 2013/0263211 A1* | 10/2013 | Neuman | H04L 63/08 726/1 |
| 2013/0275748 A1* | 10/2013 | Lu | 713/155 |
| 2013/0276077 A1 | 10/2013 | Xiong et al. | |
| 2014/0041002 A1* | 2/2014 | Liu et al. | 726/7 |
| 2014/0108599 A1* | 4/2014 | Borzycki | G06F 21/6218 709/217 |
| 2014/0189829 A1* | 7/2014 | McLachlan et al. | 726/6 |
| 2014/0325622 A1* | 10/2014 | Luk et al. | 726/6 |
| 2014/0331060 A1* | 11/2014 | Hayton | 713/186 |

OTHER PUBLICATIONS

International Search Report & Written Opinion Issued in PCT Patent Application No. PCT/US2014/059792, dated Dec. 15, 2014, 8 Pages.
Alfayyadh, et al., "Improving Usability of Password Management with Standardized Password Policies", In Proceedings of the Seventh Conference on Network and Information Systems Security, May 22, 2012, 8 pages.
"Configure Password Reset in MDM", Published on: Feb. 9, 2009, Available at: http://technet.microsoft.com/en-us/library/dd252841.aspx, 5 pages.
"Telstra Mobile Device Management Guide—Windows Phone 6.5," retrieved at http://www.telstra.com.au/business-enterprise/download/document/business-mobile-device-management-guide-windows-mobile-6.5.pdf, published prior to Jan. 21, 2014, 27 pages.
Second Written Opinion Issued in PCT Application No. PCT/US2014/059792, dated Aug. 28, 2015, 6 Pages.
"International Preliminary Report on Patentability Issued in PCT Application No. PCT/US2014/059792", dated Jan. 22, 2016, 7 Pages.
"First Office Action and Search Report Issued in Chinese Patent Application No. 201480056894.4", dated Jan. 29, 2018, 12 Pages.
"Office Action Issued in European Patent Application No. 14787362.4", dated May 30, 2017, 6 Pages.
"Second Office Action Issued In Chinese Patent Application No. 201480056894.4", dated Aug. 9, 2018, 9 Pages.

* cited by examiner

SECURE REMOTE MODIFICATION OF DEVICE CREDENTIALS USING DEVICE-GENERATED CREDENTIALS

CROSS-REFERENCE TO RELATED APPLICATIONS

This application claims priority to U.S. Provisional Patent Application No. 61/891,334, filed Oct. 15, 2013, and entitled "Secure Remote Modification Of Device Credentials Using Device Generated Credentials," the entirety of which is incorporated by reference herein.

BACKGROUND

Privacy and security have become a high priority for both consumers and companies that use mobile devices that contain personal or highly confidential information and data. In order to secure these devices, passwords are typically required to unlock these devices, granting access to the user. In order to increase security, stronger passwords are required that are longer in length and have higher complexity requirements. As a result, users often forget their passwords and as a result wish to be remotely granted temporary access to their device in order to set a new password.

Some companies have solved this problem by enabling IT (information technology) administrators to remotely clear a password from a device, granting access to the user. While this grants the user access to the device, it does so in an insecure manner, making the device and the data vulnerable during the time period while the password is reset. Another approach has been to pre-set a recovery key on a mobile device that can be provided to the user. However, this approach reduces the security of the device because two passwords are available to grant access to the device. Furthermore, this approach does not provide an extensible way to require the user to provide additional authentication information to ensure the recovery key has not been stolen or hacked that can be driven by the server.

Changing credentials is relatively easy when all user records are stored in a central database, such as an active directory or proprietary user database. However, there is no such database for PIN (personal identification number) codes used on smartphones, some of which might belong to a company that issued the device to a user employee, and some of which may belong directly to the employee. The PIN is usually known only to the user and is set in accordance with requirements from multiple sources. Pushing a new PIN from a management service to a device may not be possible because the actual policy that sets requirements for the PIN may be known to the device but not the server.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided that enable secure remote modification of user device credentials by enabling user device credentials to be generated on the user device, and that enable additional embodiments described herein. For instance, techniques are provided to securely and remotely modify credentials on a user device, taking into account a variety of factors that may not be known to a management system for the user device (e.g., required password complexity). The modification of the credentials may also be performed without disclosing the new or old credentials to an administrator.

In instance, in one implementation, a method in a user device is provided. A plurality of credentials policies is stored by the user device. A credentials policy sets rules/requirements for a credentials (e.g., a PIN code or password), and may include, but not be limited to a length, a complexity, history requirements, and/or other requirement for the credentials. The credentials policies are merged to generate a merged credentials policy. An instruction is received by the user device from a trusted service to initiate a device credentials change. A new device credentials is generated on the user device based at least on the merged credentials policy.

In one aspect, the new device credentials may be stored in storage of the user device and transmitted to the trusted service. In an alternative aspect, the new device credentials may be stored in storage of the user device without being transmitted to the trusted service.

Furthermore, in an implementation, the new device credentials may be generated based at least on the merged credentials policy and a seed that is known to the trusted service. The new device credentials may be generated to have an associated active lifespan.

An access request may be received from a user attempting to access the user device. The user may be requested to provide at least the new device credentials to be enabled to access to the user device. The user may additionally be requested to answer at least one security question, authenticate using a smartcard previously associated with the device, and/or provide another authentication factor in addition to providing the new device credentials to be enabled to access to the user device.

In another implementation, a user device is provided. The user device includes storage, a device management engine, and a credential generation engine. The storage stores a plurality of credentials policies. The device management engine is configured to merge the credentials policies to generate a merged credentials policy. The device management engine is configured to receive an instruction from a trusted service to initiate a device credentials change, and to instruct the credential generation engine to generate a new device credentials based at least on the merged credentials policy.

In one implementation, the device management engine is configured to transmit the new device credentials to the trusted service in response to a device credentials retrieval request received from the trusted service. In an alternative aspect, the device management engine is configured to store the new device credentials in the storage, and the new device credentials is not transmitted to the trusted service.

In an implementation, the credential generation engine may be configured to generate the new device credentials based at least on the merged credentials policy and a seed that is known to the trusted service. The credential generation engine may be configured to generate the new device credentials to have an associated active lifespan.

The user device may further include an access user interface configured to receive an access request from a user attempting to access the user device, and configured to require the user to provide at least the new device credentials to be enabled to access to the user device. The access user interface may be configured to request that the user answer at least one security question in addition to providing the new device credentials to be enabled to access to the user device.

A computer readable storage medium is also disclosed herein having computer program instructions stored therein that enables secure remote modification of user device credentials by enabling user device credentials to be generated on the user device, according to the embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
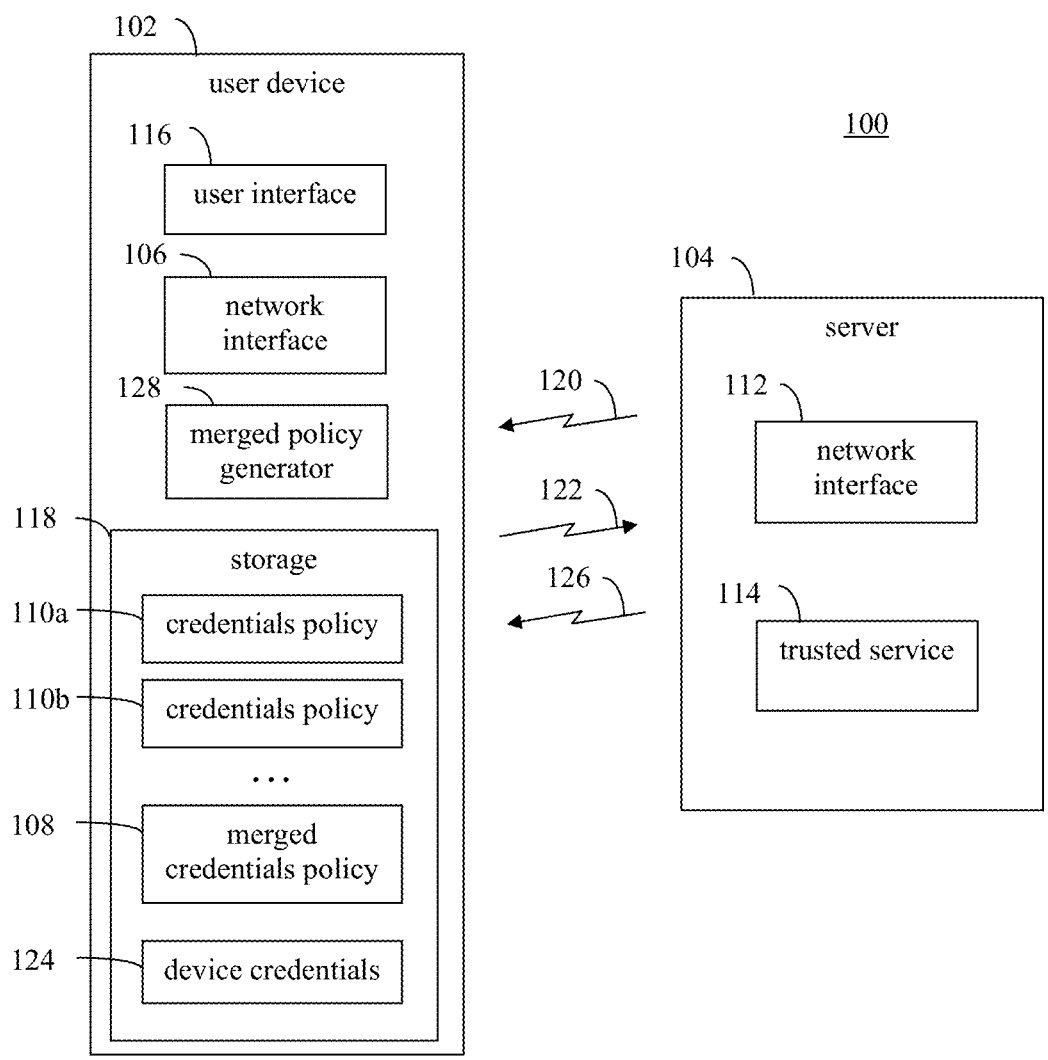
FIG. 1 shows a block diagram of a communication system in which a server device communicates with a user device to cause new device credentials to be generated for the user device, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments are described herein that enable secure remote modification of user device credentials. In an embodiment, a "trusted service" is enabled to remotely change credentials on a user device. The user device has previously been mutually authenticated with the "trusted service". Furthermore, the user device has granted the "trusted service" the ability to communicate, initiation action, and modify data over a secured channel. This allows the "trusted service" to add, update, and modify credentials-based policies on the user device. The "trusted service" can request the user device to generate a new credentials that meets the password policies set on the user device, which the "trusted service" may or may not be privy to. The request can add additional requirements, can modify or augment the credentials policies stored in the user device (e.g., the trusted service may provide a credentials policy), and/or can provide additional and/or alternative data that must be met or provided on the device for the generated credentials to be used. After the user device successfully changes the credentials on the user device, the "trusted service" can remotely retrieve the credentials if the criteria for allowing the "trusted service" to retrieve the credentials are met. Initiation of generation of new credentials on the user device can be performed by an IT administrator and/or by the user himself/herself (e.g., using a self-service portal that authenticates the user and allows the user to perform certain operations on managed devices).

Accordingly new credentials (e.g., a new password, a new PIN code, etc.) may be generated on a user device in accordance with requirements from multiple management sources. The effective policy is a product of merging multiple policies coming from one or more of Exchange Servers (e.g., Email or other messaging servers), Mobile Device Management (MDM) systems, built-in criteria, etc.

In an embodiment, a remote service may initiate the change of credentials on the user device to protect the user device (without the remote service providing a new credentials to the device).

In an embodiment, a newly generated credentials for a user device (generated at the user device) may be provided to the user without disclosing the newly generated credentials to an IT administrator for the user device.

In an embodiment, the user device-generated credentials can be seeded by the "trusted service" (also referred to herein as the "remote service"). The service that seeds the credentials can be a different "trusted service" or the same "trusted service" as the one initiating the credentials change.

The user device-generated credentials may require an additional authentication factor or factors to be provided by a user before the user is allowed to use a device-generated credentials. These additional authentication factors can be set dynamically by the "trusted service". For instance, the user may be requested to answer one or more security questions, provide a fingerprint, authenticate using a smartcard previously associated with the device, or provide one or more further types of authentication factors.

The user device-generated credentials may be configured with an associated "active" lifespan during which the credentials are considered valid. After this lifespan, the generated credentials are no longer valid (e.g., the credentials expire). The user device may be configured to continue allowing a previous credentials to be used, or may be configured to prevent any credentials from being entered until a new password with an "active" lifespan is determined on the user device.

Embodiments may be implemented in devices and servers in various ways. For instance, FIG. 1 shows a block diagram of a communication system 100 in which a server 104 communicates with a user device 102 to cause new device credentials to be generated for user device 102, according to an example embodiment. As shown in FIG. 1, user device 102 includes a network interface 106, a user interface 116, a storage 118, and a merged policy generator 128. Server 104 includes a network interface 112 and a trusted service 114. User device 102 and server 104 are described in further detail as follows.

User device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, a Palm® device, a RIM Blackberry® device, etc.), a wearable computing device (e.g., a smart watch, smart glasses such as Google® Glass™, etc.), or other type of mobile device (e.g., an automobile), or a stationary computing device such as a desktop computer or PC (personal computer). Still further, user device 102 may be an electronic locking device that is accessible over a communication link (e.g., a Kevo™ electronic lock, deadbolt, or lever distributed by Kwikset Corporation of Lake Forest, Calif.), etc. Server 104 may be implemented in one or more computer systems (e.g., servers), and may be mobile (e.g., handheld) or stationary. Server 104 may be considered a "cloud-based" server, may be included in a private or other network, or may be considered network accessible in another way.

Storage 118 may include one or more of any type of storage mechanism to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

Network interface 112 of server 104 enables server 104 to communicate over one or more networks, and network interface 106 of user device 102 enables user device 102 to communicate over one or more networks. Examples of such networks include a local area network (LAN), a wide area network (WAN), a personal area network (PAN), or a combination of communication networks, such as the Internet. Network interfaces 106 and 112 may each include one or more of any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc.

User interface 116 of user device 102 enables a user to interact with user device 102 to perform functions. In one example, user device 102 may be in a locked state. In such a state, a user may be unable to access functions of user device 102, other than a camera, or emergency functions (e.g., enabled to make a phone call). Furthermore, in the locked state, user interface 116 may display a login screen that a user may interact with to unlock user device 102, causing user device 102 to transition to the unlocked state. For instance, user interface 116 may enable the user to provide device credentials, such as a password, to unlock user device 102. User interface 116 may enable the user to provide the password in various ways, such as by typing in the password on a virtual or physical keypad, by speaking the password, by one or more gestures, etc. Once the proper device credentials are received at user interface 116, user device 102 is unlocked, and additional functions of user device 102 are made available through user interface 116, such as access to one or more applications, email, text messaging, etc.

Trusted service 114 of server 104 has remote access and is mutually authenticated with user device 102. User device 102 registers with trusted service 114, which allows user device 102 to be managed by the trusted service 114. Specifically, user device 102 allows trusted service 114 to set policies on user device 102 that are related to credentials policy and allows trusted service 114 to request user device 102 to generate a new credentials and remotely retrieve the credentials from user device 102. Additionally, trusted service 114 is configured to initiate communications with user device 102 via network interfaces 112 and 106. The communications may be initiated by user device 102 through a previously set schedule negotiated between user device 102 and trusted service 114, or may be "on-demand" over a persistent or semi-persistent connection maintained between user device 102 and server 104 via network interfaces 106 and 112. Alternatively, trusted service 114 may communicate with user device 102 over cellular-specific forms of communication (e.g., SMS (short message service), MMS (multimedia messaging service), etc.).

Figure 2:
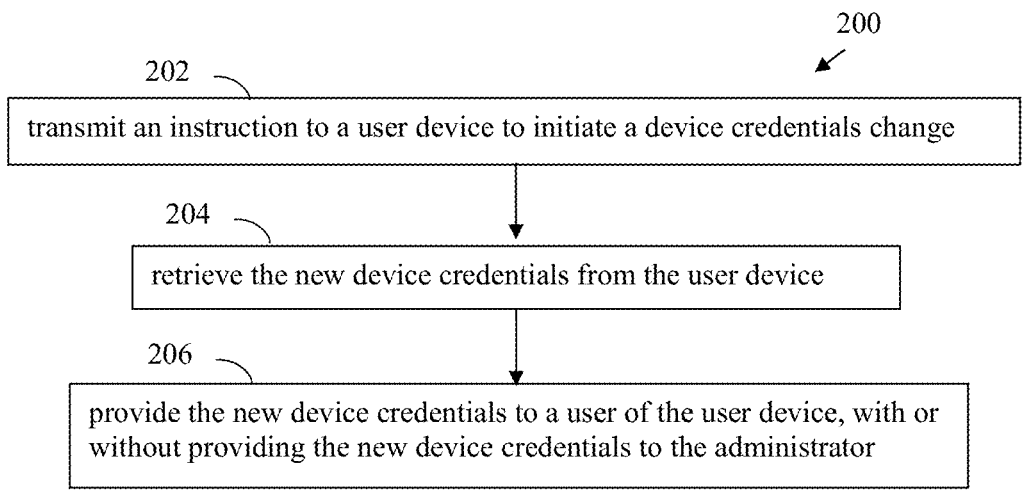
FIG. 2 shows a flowchart providing a process in a server for causing a user device to generate new device credentials, according to an example embodiment.

Trusted service 114 may be configured and may operate in various ways to perform these functions. For instance, FIG. 2 shows a flowchart 200 providing a process for causing a user device to generate new device credentials, according to an example embodiment. Trusted service 114 in server 104 may operate according to flowchart 200, in an embodiment. Flowchart 200 is described as follows. Note that in some embodiments, not all steps of flowchart 200 need to be performed. Further structural and operational embodiments will be apparent to persons skilled in the relevant art(s) based on the following description.

Flowchart 200 begins with step 202. In step 202, an instruction is transmitted to a user device to initiate a device credentials change. For example, as shown in FIG. 1, server 104 may wired and/or wirelessly communicate with user device 102 by transmitting an instruction signal 120, which is received by user device 102. Instruction signal 120 may instruct user device 102 to generate new device credentials, such as a new password for enabling access to user device 102. User device 102 may generate the new device credentials in response to instruction signal 120, which are shown stored in storage 118 as device credentials 124. Note that in an embodiment, as further described below, user device 102 may generate the new device credentials according to a merged credentials policy 108 (shown stored in storage 118 in FIG. 1).

In step 204, the new device credentials are retrieved from the user device. Note that step 204 is optional. In an embodiment, trusted service 114 may decide to retrieve the new device credentials (device credentials 124) from user device 102. In such a situation, trusted service 114 may transmit a device credentials request 126 to user device 102 (via network interface 112), and user device 102 may receive device credentials request 126 (via network interface 106). In response to device credentials request 126, user device 102 may transmit device credentials 124 to server 104 in a response signal 122 (via network interface 106). Response signal 122 is received by server 104 (via network interface 112).

In this manner, trusted service 114 may receive the new device credentials from user device 102. Furthermore, trusted service 114 did not generate the new device credentials—the new device credentials were instead generated by user device 102. Trusted service 114 initiated the generation of the new device credentials by user device 102 by transmitting instruction signal 120.

In step 206, the new device credentials are provided to a user of the user device, with or without providing the new device credentials to the administrator. Note that in an embodiment, trusted service 114 may provide the new device credentials to a user of the user device via a user interface (e.g., a web portal), an email, a text message, or in any other manner. For instance, the user may have instigated generation of the new device credentials by trusted service 114 through a new password request (e.g., due to forgetting the password, losing user device 102, fearing user device 102 is stolen, etc.), an IT administrator may have instigated generation of the new device credentials by trusted service 114 through a new password request or for other reason (e.g., a threshold number of failed password attempts has been reached), or trusted service 114 may have independently initiated the generation of the new device credentials. The new device credentials may be provided to the user with or without the administrator having been shown the new device credentials.

Note that a service on user device 102 can initiate a connection to trusted service 114 that is used to securely pass the information between trusted service 114 and user device 102. Alternatively, trusted service 114 can utilize a different connection that is maintained with user device 102 to initiate a direct connection from the device to the "trusted service."

As shown in FIG. 1, user device 102 includes storage 118, which contains a store of device credentials for user device 102. The device credentials store includes a first credentials policy 110a, a second credentials policy 110b, optionally one or more further credentials policies (not shown in FIG. 1), and a merged credentials policy 108. The credentials policies are used to validate new passwords to meet those policies. For instance, each of first credentials policy 110a, second credentials policy 110b, etc., may be used to set policies for a corresponding password used to access a service on user device 102, such as an email service, a master data management (MDM) service, etc. Each credentials policy may set one or more rules for a particular password, such as a minimum and/or maximum number of characters, whether the password must include letters and/or numbers, whether the password must include upper case and/or lower case letters, whether one or more special characters must be present, whether the password can include any dictionary words, etc.

Note that one of the credentials policies in storage 118 may be a default credentials policy for user device 102, which contains a default set of rules for a password of user device 102. This default credentials policy may be initially set when user device 102 is first manufactured or at another time. Furthermore, in some embodiments, the default credentials policy may be updated from time to time, such that one or more of the contained rules are modified.

In an embodiment, merged policy generator 128 is configured to merge the credentials policies that are present on user device 102 for the user to generate merged credentials policy 108, which, in an embodiment, conforms to the most stringent of the rules of the credential policies that are merged (a "most stringent" rule). Merged credentials policy 108 is used as the device credentials policy for generating device credentials for access to user device 102 via user interface 116 (e.g., to unlock user device 102, as described above). As such, credentials generation is performed on user device 102 that creates a new device credentials (device credentials 124) that adheres to merged credentials policy 108.

For example, if first credentials policy 110a requires a minimum of seven password characters, and second credentials policy 110b requires a minimum of eight password characters, merged policy generator 128 generates merged credentials policy 108 to require the most stringent minimum number of characters for a password required by policies 110a and 110b, which is eight password characters. Furthermore, if first credentials policy 110a does not require numeric characters, and second credentials policy 110b does require numeric characters, merged policy generator 128 generates merged credentials policy 108 to be the most stringent with respect to requiring numeric characters, which is to require numeric characters per policy 110b. Still further, if first credentials policy 110a does require at least one special character, and second credentials policy 110b does not require any special characters, merged policy generator 128 generates merged credentials policy 108 to be the most stringent with respect to requiring special characters, which is to require at least one special character per policy 110a.

Note that in an embodiment, one of the rules included in a credentials policy may be a credentials retrieval rule. The credentials retrieval rule may indicate whether a trusted service is allowed to retrieve credentials from user device 102 (e.g., according to step 204 of flowchart 200 in FIG. 2). Thus, the credentials retrieval rule may indicate that "yes," credentials may be retrieved from user device 102 by a trusted service, or "no," credentials may not be retrieved from user device 102 by a trusted service. In the event that at least one credentials policy being merged with other credentials policies by merged policy generator 128 has a credentials retrieval rule that indicates that credentials may not be retrieved, then in one embodiment, where the most stringent rule is used, merged credentials policy 108 will be generated to indicate that credentials may not be retrieved. Thus, in such case, a single credentials policy may prevent all trusted services from being able to retrieve credentials.

In another embodiment, for the purposes of merging credentials retrieval rules, merged policy generator 128 may be configured to use a "least stringent" rule, such that if at least one credentials policy being merged with other credentials policies has a credentials retrieval rule that indicates that credentials may be retrieved, merged credentials policy 108 will be generated to indicate that credentials may be retrieved (even if one or more credentials policies have credentials retrieval rules against retrieving credentials). It is noted that in some embodiments, merged policy generator 128 may apply the "least stringent" rule when merging other types of rules of credentials polices, where appropriate. In even further embodiments, merged policy generator 128 may be configured to use merging rules that are between the "least stringent" and "most stringent" rules, such as by applying an "average stringency" rule, where the values of rules of the credentials policies being merged are averaged, a "most common" rule, where a most common value for a rule of the credentials policies being merged is selected, etc.

Still further, in an embodiment, one of the rules included in a credentials policy may be a credential reset and retrieval frequency rule. The credential reset and retrieval frequency rule may indicate a frequency at which a trusted service may attempt to request device credentials from user device 102. For example, a credential reset and retrieval frequency rule may indicate a number of requests that may be made by a trusted service, a number of requests that may be made by a trusted service within a specific time period, an amount of time for a trusted service to wait between requests, etc. In an embodiment, the credential reset and retrieval frequency rule may indicate a backoff rate at which a trusted service can reset and request the device credentials. The backoff rate is an increasing amount of time (e.g., an increase of 5 minutes from the last request, etc.) that must be waited between sequential device credentials requests by a trusted service. A credential reset and retrieval frequency rule may be useful in preventing compromised or malfunctioning trusted services from making large numbers of device credentials resets and requests in a relatively short amount of time. If multiple credentials policies include a credential reset and retrieval frequency rule, merged policy generator 128 may merge the credential reset and retrieval frequency rules according to the "least stringent" rule, the "most stringent rule," or other rule.

Figure 3:
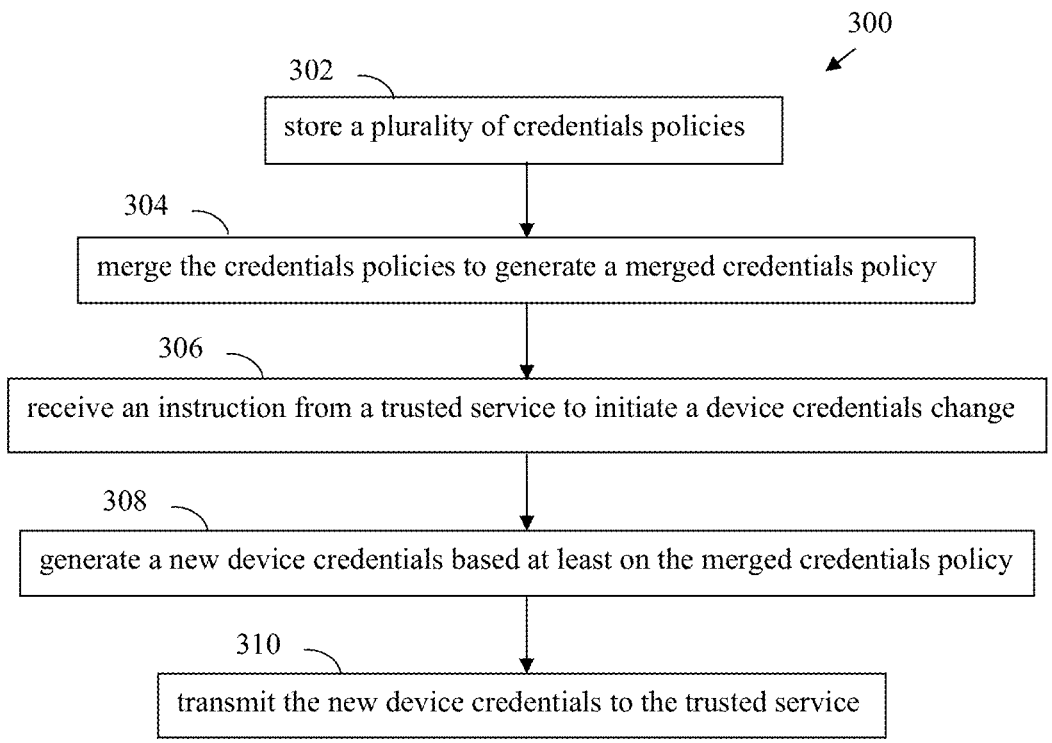
FIG. 3 shows a flowchart providing a process in a user device to merge device credential policies and to generate new device credentials based on the merged device credential policies, according to an example embodiment.

User device 102 may operate in various ways to perform these functions. For instance, FIG. 3 shows a flowchart 300 providing a process in a user device to merge device credential policies and to generate new device credentials based on the merged device credential policies, according to an example embodiment. User device 102 may operate according to flowchart 300, in an embodiment. Flowchart 300 is described as follows. Note that in some embodiments, not all steps of flowchart 300 need to be performed. Further structural and operational embodiments will be apparent to persons skilled in the relevant art(s) based on the following description.

Flowchart 300 begins with step 302. In step 302, a plurality of credentials policies is stored. For example, as shown in FIG. 1, storage 118 stores first and second credentials policies 110a and 110b, and may optionally store any number of further credentials policies.

In step 304, the credentials policies are merged to generate a merged credentials policy. For instance, as described above, in an embodiment, merged policy generator 128 may merge credentials policies 110a and 110b (and any further credentials policies) on user device 102 to generate merged credentials policy 108.

In step 306, an instruction is received from a trusted service to initiate a device credentials change. For example, as described above, user device 102 may receive instruction signal 120 from trusted service 114 at server 104. Instruction signal 120 instructs user device 102 to generate a new device credentials (e.g., a new device password).

In step 308, a new device credentials is generated based at least on the merged credentials policy. In an embodiment, user device 102 generates a new device credentials, which is stored as device credentials 124 in storage 118, in response to instruction signal 120.

In step 310, the new device credentials is transmitted to the trusted service. Step 310 is optional. In an embodiment, as described above, trusted service 114 may request that user device 102 transmit the new device credentials to trusted server 114 by providing device credentials request 126. In response to device credentials request 126, user device 102 may transmit device credentials 124 to server 104 in response signal 122

Accordingly, a "trusted service" can remotely use a channel established between the "trusted service" and a user device to request a new device credentials. The credentials are user device-generated based on the credentials generation technique configured on the user device. This credentials are generated to meet or exceed the credentials policies set on the device by being based on a merged credentials policy.

In another embodiment, the credentials can be generated on the user device using a seed value provided by the "trusted service" or another service that the "trusted service" and user device both trust. Assuming that the "trusted service" has knowledge of the algorithm used to generate a credentials on the user device using the seed, and it is aware of relevant policies, the "trusted service" is enabled to generate the same device credentials (e.g., a same device password) as is separately generated on the user device without needing to additionally retrieve the credentials from the user device. It is noted that in some cases, as described elsewhere herein, there may not be any reason for the "trusted service" to have the credentials, and thus, in such an embodiment, the "trusted service" may or may not be capable of independently generating the credentials.

In still another embodiment, the "trusted service" might add additional criteria requirements associated with the validity of the generated password. For instance, the criteria might include a timespan in which the generated password can be used, and/or may include additional information that must be provided with the generated password. For instance, the additional information may be information known to the user, which the user previously provided to the trusted service (e.g., by answering questions such as "what is your mother's maiden name," "what is the name of your elementary school," etc.).

Using the authenticated channel, the "trusted service" can retrieve the newly generated credentials from the device. If the request made by the "trusted service" meets the criteria in which the "trusted service" can retrieve the credentials, then the credentials can be securely passed to the "trusted service" from the user device. The criteria for retrieving the credentials may be provisioned by the "trusted service". If the "trusted service" attempts to retrieve the credentials when the criteria provisioned on the user device is not met, then the "trusted service" will not be provided any credentials. The "trusted service" may optionally be limited in the number of times that the credentials may be retrieved or attempted to be retrieved.

Figure 4:
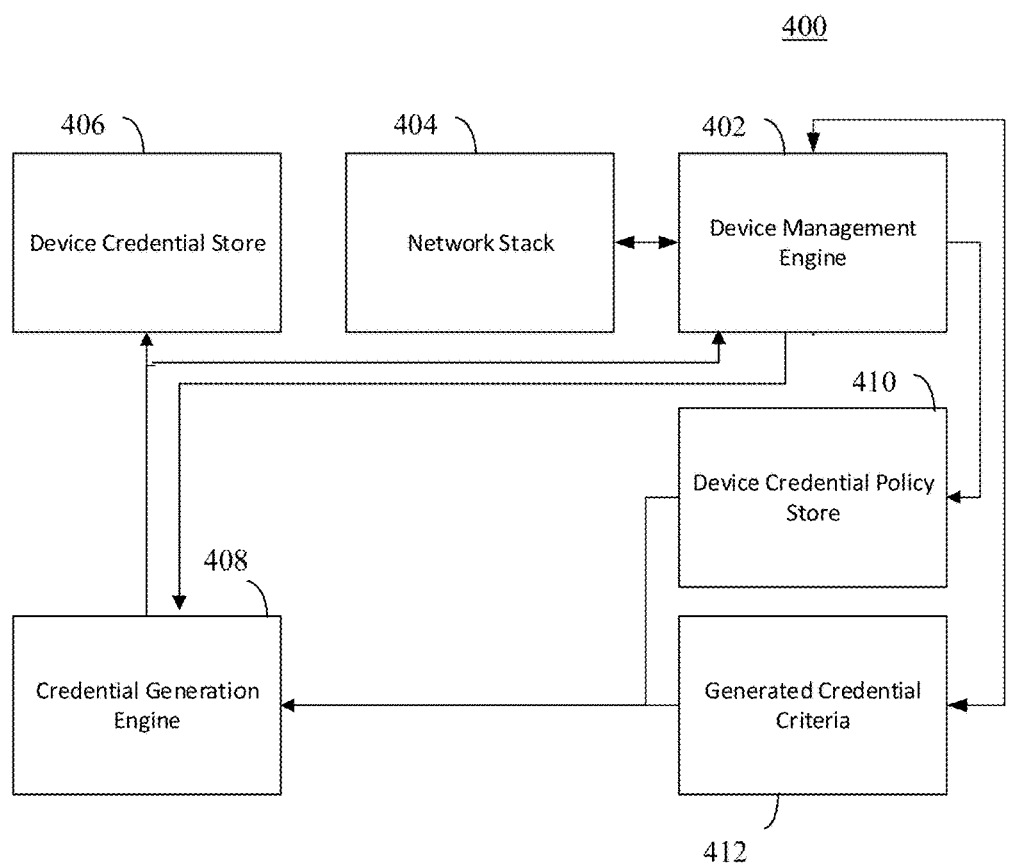
FIG. 4 shows a block diagram of a user device that is configured to merge device credential policies and to generate new device credentials based on the merged device credential policies when instructed by a server, according to an example embodiment.

A user device may be configured in various ways to perform these functions. For instance, FIG. 4 shows a block diagram of a user device 400 that is configured to merge device credential policies and to generate new device credentials based on the merged device credential policies when instructed by a server, according to an example embodiment. In an embodiment, features of user device 400 shown in FIG. 4 may be included in user device 102 to perform its functions. As shown in FIG. 4, user device 400 includes a device management engine 402, a network stack 404, a device credential store 406, a credential generation engine 408, a device credential policy store 410, and a generated credential criteria 412.

In FIG. 4, user device 400 has an authenticated connection with the "trusted service" (e.g., trusted service 114 of FIG. 1). User device 400 has registered with the "trusted service" and is allowing itself to be managed by the "trusted service". The "trusted service" uses this connection to set credentials policies on the device such as the length requirement of the credentials or the complexity requirement of the credentials (examples of which are provided above). The "trusted service" uses this connection to initiate the credentials modification and additionally set the criteria in which the generated credentials is valid and conditions under which the credentials can be retrieved by the "trusted device".

Device management engine 402 is a service on user device 400 that communicates using network stack 404 with the "trusted service" (network stack 404 is an example of network interface 106 of FIG. 1). Device management engine 402 is configured to set credentials policies on behalf of the "trusted service," request credentials modification, and set any criteria related to the use of or access to the generated credentials.

Device credential policy store 410 stores credential policies (e.g., first and second credential policies 110a and 110b, etc., merged credentials policy 108, of FIG. 1). Generated credential criteria 412 includes additional items that may be required when determining the validity of a generated password. For instance, criteria 412 may include a timespan in which a generated password can be used, and/or may include additional information that must be provided with the generated password.

Figure 5:
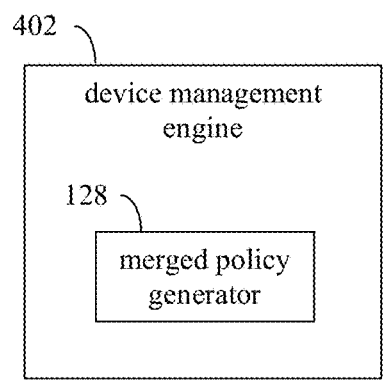
FIG. 5 shows a block diagram of a device management engine that is configured to merge device credential policies, according to an example embodiment.

In an embodiment, device management engine 402 may be configured to generate a merged credential policy (e.g., merged credential policy 108 of FIG. 1) based on credential policies maintained by device credential policy store 410. For instance, in an embodiment, as shown in FIG. 5, device management engine 402 may include merged policy generator 128 of FIG. 1.

Credential generation engine 408 is configured to generate device credentials for user device 400 based on the merged credentials policy. For instance, credential generation engine 408 may generate new device credentials in response to an instruction from device management engine 402 (which may receive such an instruction from the trusted service). Credential generation engine 408 may continue to generate credentials until a credentials is generated that meets the merged credentials policy of user device 400. Credential generation engine 408 provides the newly generated credentials (e.g., device credentials 124 of FIG. 1), along with any additional authentication requirements the user needs to provide as additional forms of authentication, to be maintained in device credentials store 406. Credential generation engine 408 also may provide a copy of the generated credentials to device management engine 402 to be accessed by the "trusted service." Device management engine 402 can then broker access to the device credentials to provide the credentials only if previously set criteria are met on user device 400. If the criteria are met, the credentials may be provided to the "trusted service".

In an embodiment, as described above, the credentials can be generated on the user device using a seed value provided by the "trusted service" or another service that the "trusted service" and user device both trust. For example, credential generation engine 408 may access the seed value to generate new credentials for user device 400, while the trusted service separately generates the same new credentials for user device 400 based on the seed value stored at the trusted service.

Figure 6:
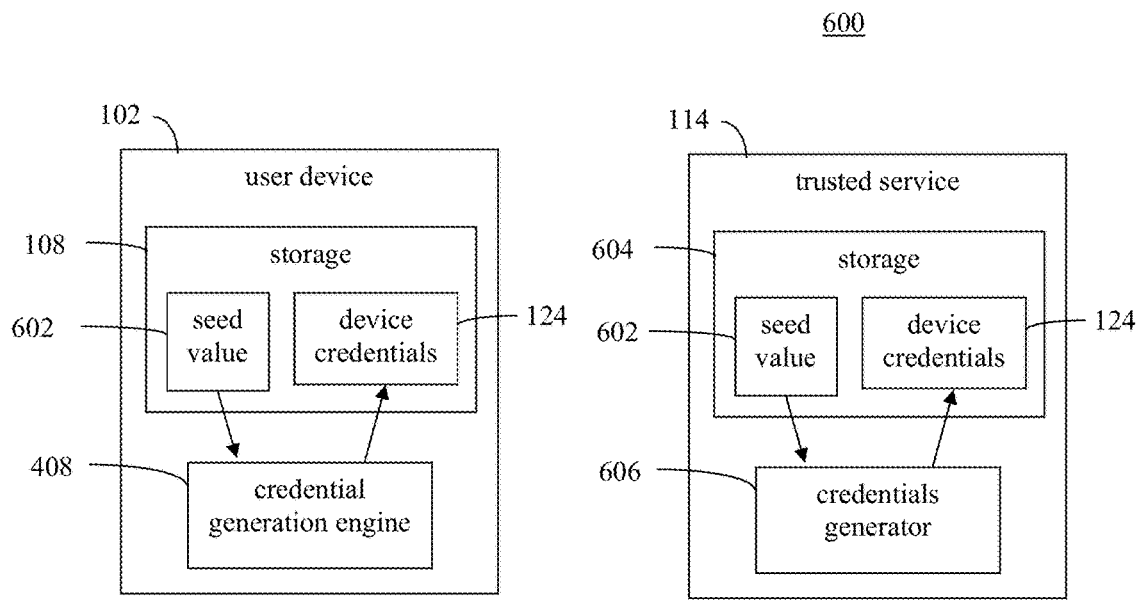
FIG. 6 shows a block diagram of a communication system in which a user device and a trusted service are configured to independently generate new device credentials for the user device based on a same seed value stored at both of the trusted service and user device, according to an example embodiment.
Figure 7:
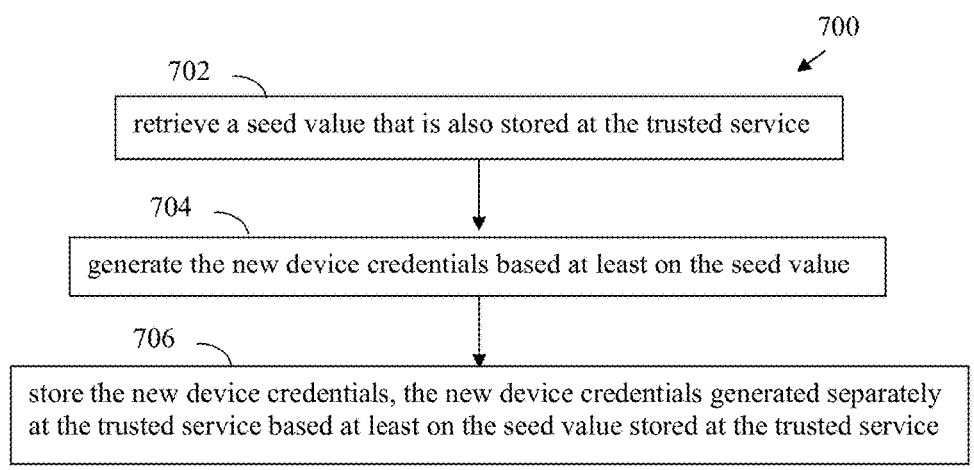
FIG. 7 shows a flowchart providing a process in a user device to generate a same new device credentials for the user device as is independently generated by a trusted service for the user device based on a same seed value, according to an example embodiment.

For instance, FIG. 6 shows a block diagram of a communication system 600 in which user device 102 and trusted service 114 are configured to independently generate new device credentials for the user device based on a same seed value, according to an example embodiment. Communication system 600 is an example of communication system 100 of FIG. 1, with some features of communication system 100 not shown in FIG. 6 for ease of illustration. In an embodiment, user device 102 of FIG. 6 may operate according to FIG. 7. FIG. 7 shows a flowchart 700 providing a process for generating a new device credentials for a user device, according to an example embodiment. Flowchart 700 and communication system 600 are described as follows.

Flowchart 700 begins with step 702. In step 702, a seed value is retrieved that is also stored at the trusted service. As shown in FIG. 6, user device 102 includes storage 108 that stores a seed value 602. Seed value 602 is a binary, hexadecimal, numerical, alphanumerical, or other type of data string that may be used as a seed value for an algorithm used to generate credentials (e.g., a pseudorandom number generator, etc.). The same seed value 602 is also independently stored in storage 604 at trusted service 114. As shown in FIG. 6, credential generation engine 408 may retrieve seed value 602 from storage 108.

In step 704, the new device credentials are generated based at least on the seed value. For instance, in an embodiment, credential generation engine 408 implements a credentials generation algorithm (e.g., a pseudorandom number generator, etc.) that receives seed value 602 as an input, and generates new device credentials. As shown in FIG. 6, trusted service 114 includes a credentials generator 606. Credentials generator 606 implements a same credentials generation algorithm as credential generation engine 408, and retrieves seed value 602 from storage 602. Credentials generator 606 independently generates a new device credentials for user device 102 having the same value as the new device credentials generated by credential generation engine 408 for user device 102.

In step 706, the new device credentials are stored, the new device credentials generated separately at the trusted service based at least on the seed value stored at the trusted service.

As shown in FIG. 6, credential generation engine 408 may store the newly generated device credentials in storage 108 as device credentials 124. In parallel, credentials generator 606 may store the independently generated device credentials in storage 604 as device credentials 124. The values of device credentials 124 at user device 102 and trusted service 114 are the same due to the same algorithm being used. Because trusted service 114 has knowledge of the algorithm used to generate the new credentials at user device 102 using seed value 602, and is aware of relevant policies, trusted service 114 is enabled to generate the same device credentials (e.g., the same device password) as is separately generated on user device 102 by credential generation engine 408 without needing to additionally retrieve the credentials from user device 102.

In any case, now that the generated credentials are stored in device credentials store 406 along with other requirements related to the validity of the credentials and additional authentication that must accompany the generated credentials, the user can be granted access to the device by providing the correct information to the system (e.g., to user interface 116 of FIG. 1).

III. Example User Device and Server Embodiments

User device 102, server 104, trusted service 114, merged policy generator 128, user device 400, device management engine 402, network stack 404, credential generation engine 408, credentials generator 606, flowchart 200, flowchart 300, and flowchart 700 may be implemented in hardware, or hardware combined with software and/or firmware. For example, user device 102, server 104, trusted service 114, merged policy generator 128, user device 400, device management engine 402, network stack 404, credential generation engine 408, credentials generator 606, flowchart 200, flowchart 300, and/or flowchart 700 may be implemented as computer program code/instructions configured to be executed in one or more processors and stored in a computer readable storage medium. Alternatively, user device 102, server 104, trusted service 114, merged policy generator 128, user device 400, device management engine 402, network stack 404, credential generation engine 408, credentials generator 606, flowchart 200, flowchart 300, and/or flowchart 700 may be implemented as hardware logic/electrical circuitry.

For instance, in an embodiment, one or more of merged policy generator 128, device management engine 402, network stack 404, credential generation engine 408, flowchart 300, and/or flowchart 700 may be implemented together in a system-on-chip (SoC). Similarly, trusted service 114, credentials generator 606, and/or flowchart 200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits and/or embedded firmware to perform its functions.

Figure 8:
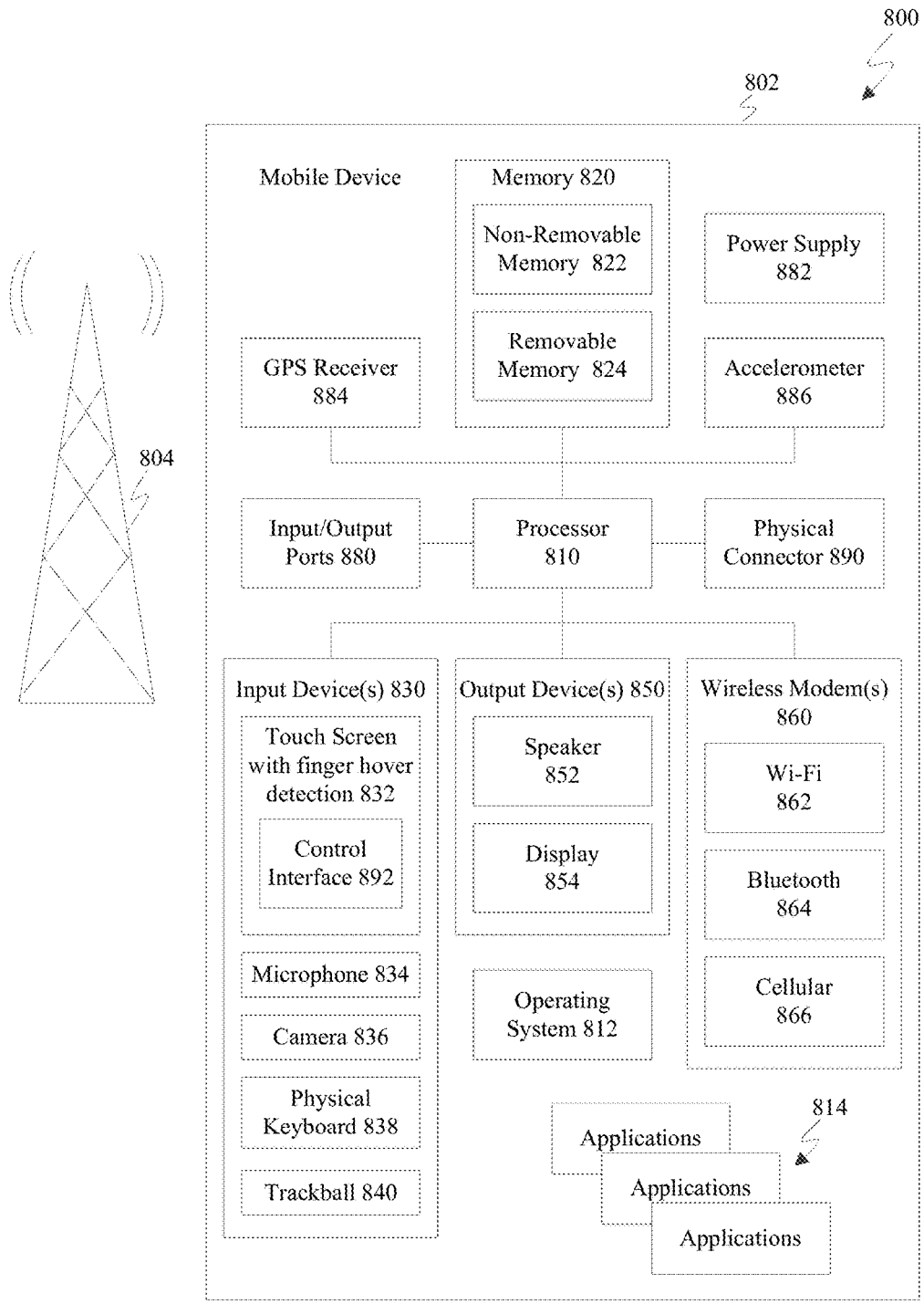
FIG. 8 shows a block diagram of an exemplary user device in which embodiments may be implemented.

FIG. 8 shows a block diagram of an exemplary mobile device 800 including a variety of optional hardware and software components, shown generally as components 802. For instance, components 802 of mobile device 800 are examples of components that may be included in user devices 102 (FIG. 1) and/or 400 (FIG. 4) in mobile device embodiments, but are not shown in FIGS. 1 and 4 for ease of illustration. Any number and combination of the features/elements of components 802 may be included in a mobile device embodiment, as well as additional and/or alternative features/elements, as would be known to persons skilled in the relevant art(s). It is noted that any of components 802 can communicate with any other of components 802, although not all connections are shown, for ease of illustration. Mobile device 800 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 804, such as a cellular or satellite network, or with a local area or wide area network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814 (a.k.a. applications, "apps", etc.). Application programs 814 can include common mobile computing applications (e.g., email applications, calendars, contact managers, web browsers, messaging applications) and any other computing applications (e.g., word processing applications, mapping applications, media player applications).

As illustrated, mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of program modules may be stored in memory 820. These programs include operating system 812, one or more application programs 814, and other program modules and program data. Examples of such application programs or program modules may include, for example, computer program logic (e.g., computer program code or instructions) for implementing user device 102, server 104, trusted service 114, merged policy generator 128, user device 400, device management engine 402, network stack 404, credential generation engine 408, credentials generator 606, flowchart 200, flowchart 300, and/or flowchart 700 (including any step of flowcharts 200, 300, and 700), and/or further embodiments described herein.

Mobile device 800 can support one or more input devices 830, such as a touch screen 832, microphone 834, camera 836, physical keyboard 838 and/or trackball 840 and one or more output devices 850, such as a speaker 852 and a display 854. Touch screens, such as touch screen 832, can detect input in different ways. For example, capacitive touch screens detect touch input when an object (e.g., a fingertip)

distorts or interrupts an electrical current running across the surface. As another example, touch screens can use optical sensors to detect touch input when beams from the optical sensors are interrupted. Physical contact with the surface of the screen is not necessary for input to be detected by some touch screens. For example, the touch screen 832 may be configured to support finger hover detection using capacitive sensing, as is well understood in the art. Other detection techniques can be used, as already described above, including camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches or between 0.75 inches and 1 inch, or between 1 inch and 1.5 inches, etc.

The touch screen 832 is shown to include a control interface 892 for illustrative purposes. The control interface 892 is configured to control content associated with a virtual element that is displayed on the touch screen 832. In an example embodiment, the control interface 892 is configured to control content that is provided by one or more of applications 814. For instance, when a user of the mobile device 800 utilizes an application, the control interface 892 may be presented to the user on touch screen 832 to enable the user to access controls that control such content. Presentation of the control interface 892 may be based on (e.g., triggered by) detection of a motion within a designated distance from the touch screen 832 or absence of such motion. Example embodiments for causing a control interface (e.g., control interface 892) to be presented on a touch screen (e.g., touch screen 832) based on a motion or absence thereof are described in greater detail below.

Other possible output devices (not shown) can include piezoelectric or other haptic output devices. Some devices can serve more than one input/output function. For example, touch screen 832 and display 854 can be combined in a single input/output device. The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice control interface that allows a user to operate the device 800 via voice commands. Further, the device 800 can comprise input devices and software that allows for user interaction via a user's spatial gestures, such as detecting and interpreting gestures to provide input to a gaming application.

Wireless modem(s) 860 can be coupled to antenna(s) (not shown) and can support two-way communications between the processor 810 and external devices, as is well understood in the art. The modem(s) 860 are shown generically and can include a cellular modem 866 for communicating with the mobile communication network 804 and/or other radio-based modems (e.g., Bluetooth 864 and/or Wi-Fi 862). Cellular modem 866 may be configured to enable phone calls (and optionally transmit data) according to any suitable communication standard or technology, such as GSM, 3G, 4G, 5G, etc. At least one of the wireless modem(s) 860 is typically configured for communication with one or more cellular networks, such as a GSM network for data and voice communications within a single cellular network, between cellular networks, or between the mobile device and a public switched telephone network (PSTN).

Mobile device 800 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be not present and other components can be additionally present as would be recognized by one skilled in the art.

Figure 9:
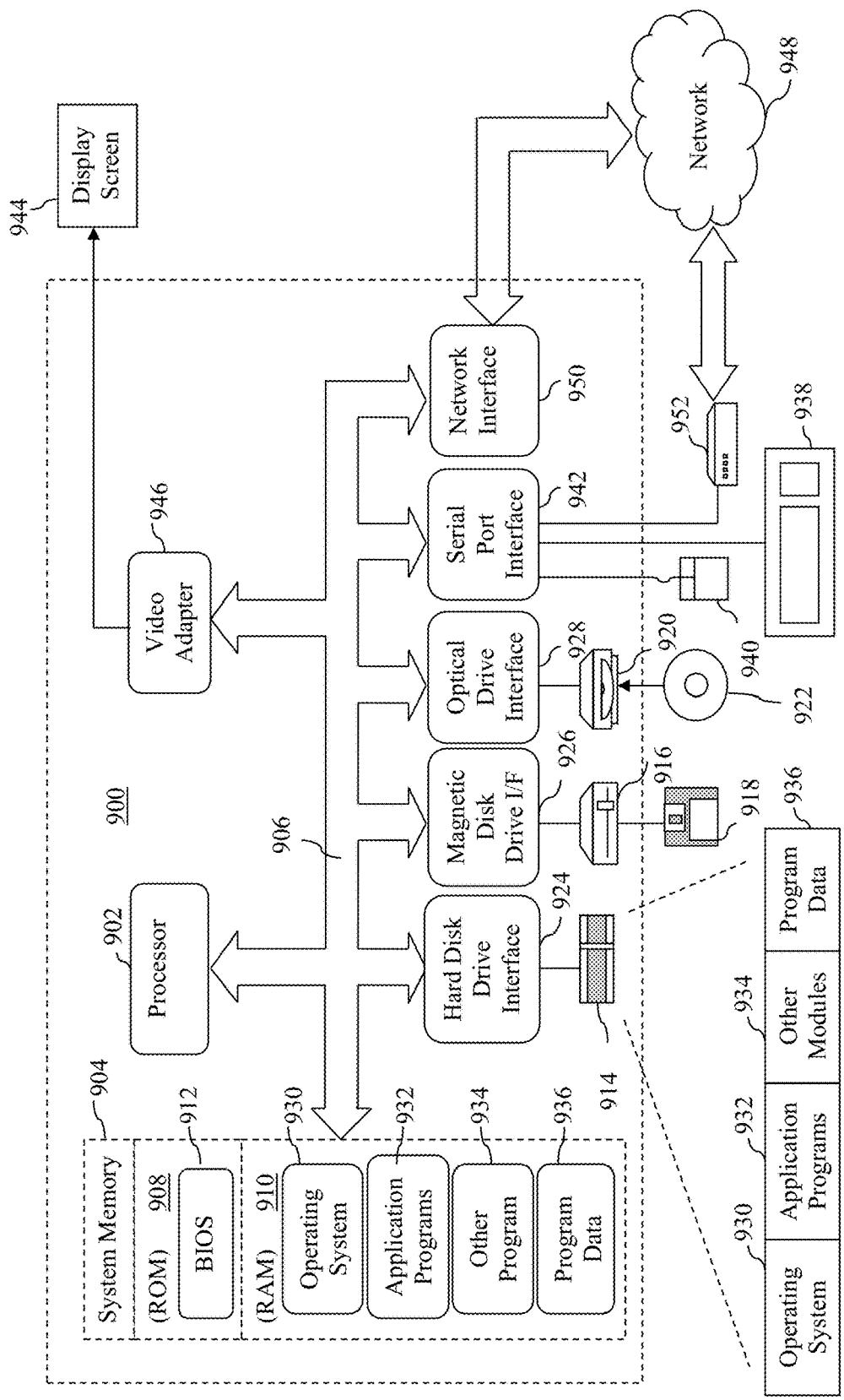
FIG. 9 shows a block diagram of an example computing device that may be used to implement embodiments.

Furthermore, FIG. 9 depicts an exemplary implementation of a computing device 900 in which embodiments may be implemented. For example, mobile device 102, mobile device 400, and/or server 104 may be implemented in one or more computing devices similar to computing device 900 in stationary computer embodiments, including one or more features of computing device 900 and/or alternative features. The description of computing device 900 provided herein is provided for purposes of illustration, and is not intended to be limiting. Embodiments may be implemented in further types of computer systems, as would be known to persons skilled in the relevant art(s).

As shown in FIG. 9, computing device 900 includes one or more processors 902, a system memory 904, and a bus 906 that couples various system components including system memory 904 to processor 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic (e.g., computer program code or instructions) for implementing user device 102, server 104, trusted service 114, merged policy generator 128, user device 400, device management engine 402, network stack 404, credential generation engine 408, credentials generator 906, flowchart 200, flowchart 300, and/or flowchart 700 (including any step of flowcharts 200, 300, and 700), and/or further embodiments described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 902 through a serial port interface 942 that is coupled to bus 906, but may be connected by other interfaces, such as a parallel port, game port, or a universal serial bus (USB).

A display screen 944 is also connected to bus 306 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to media such as the hard disk associated with hard disk drive 914, removable magnetic disk 918, removable optical disk 922, other media such as flash memory cards, digital video disks, RAMs, ROMs, and further types of physical/tangible storage media (including memory 820 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments of the invention are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMs, nanotechnology-based storage devices, and further types of physical/tangible computer readable storage media.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a user device, comprising:
storing a plurality of credentials policies at the user device;
merging the credentials policies by the user device to generate a merged credentials policy;
subsequent to storing and merging the plurality of credential policies, receiving by the user device an instruction to initiate a device credentials change from a trusted service that is external to the user device;
in response to receiving the instruction, generating by the user device a new device credentials without input from a user of the user device, the new device credentials generated based at least on the merged credentials policy; and
receiving the new device credentials, subsequent to the new device credentials being provided to the user, that allows the user of the user device to access the user device.

2. The method of claim 1, further comprising:
transmitting the new device credentials to the trusted service.

3. The method of claim 1, further comprising:
storing the new device credentials in storage of the user device, the new device credentials not transmitted to the trusted service.

4. The method of claim 1, wherein said generating comprises:
generating the new device credentials based at least on the merged credentials policy and a seed that is known to the trusted service.

5. The method of claim 1, wherein said generating comprises:
generating the new device credentials to have an associated active lifespan.

6. The method of claim 1, further comprising:
receiving an access request from a user attempting to access the user device; and
requiring the user to provide at least the new device credentials to be enabled to access to the user device.

7. The method of claim 6, wherein said requiring comprises:
requesting the user to provide at least one additional authentication factor including at least one of answering a security question or authenticating using a smartcard previously associated with the user device in addition to providing the new device credentials to be enabled to access to the user device.

8. A user device, comprising:
storage that stores a plurality of credentials policies;
a user interface;
a device management engine configured to merge the credentials policies to generate a merged credentials policy; and
a credential generation engine;
the device management engine configured to subsequent to storing and merging the plurality of credential policies in the storage, receive by the device management engine of the user device an instruction to initiate a device credentials change from a trusted service that is external to the user device, and in response to receiving the instruction, to instruct the credential generation engine to generate a new device credentials by the credential generation engine of the user device without input from a user of the user device, the new device credentials generated based at least on the merged credentials policy;
the user interface configured to accept entry of the new device credentials, subsequent to the new device credentials being provided to the user, that allows the user to access the user device.

9. The user device of claim 8, wherein the device management engine is configured to transmit the new device credentials to the trusted service in response to a device credentials retrieval request received from the trusted service.

10. The user device of claim 8, wherein the device management engine is configured to store the new device credentials in the storage, the new device credentials not transmitted to the trusted service.

11. The user device of claim 8, wherein the credential generation engine is configured to generate the new device credentials based at least on the merged credentials policy and a seed that is known to the trusted service.

12. The user device of claim 8, wherein the credential generation engine is configured to generate the new device credentials to have an associated active lifespan.

13. The user device of claim 8, further comprising:
an access user interface configured to receive an access request from a user attempting to access the user device, and configured to require the user to provide at least the new device credentials to be enabled to access to the user device.

14. The user device of claim 13, wherein the access user interface is configured to request that the user answer at least one security question or authenticating using a smartcard previously associated with the user device in addition to providing the new device credentials to be enabled to access to the user device.

15. A computer-readable storage device comprising computer executable instructions that, when executed by a processor, perform a method in a user device, the method comprising:
storing a plurality of credentials policies and at least one additional requirement related to the credentials policies at the user device, each credentials policy setting one or more rules for a particular password;
merging the credentials policies, by the user device, to generate a merged credentials policy that conforms to the most stringent of the rules of the credential policies;
subsequent to storing and merging the plurality of credential policies, receiving by the user device an instruction to initiate a device credentials change from a trusted service that is external to the user device;
in response to receiving the instruction, generating by the user device a new device credentials without input from a user of the user device, the new device credentials generated based at least on the merged credentials policy; and
receiving the new device credentials, subsequent to the new device credentials being provided to the user, that allows the user of the user device to access the user device.

16. The computer-readable storage device of claim 15, wherein the method further comprises:
transmitting the new device credentials to the trusted service.

17. The computer-readable storage device of claim 15, wherein the method further comprises:
storing the new device credentials in storage of the user device, the new device credentials not transmitted to the trusted service.

18. The computer-readable storage device of claim 15, wherein said generating comprises:
generating the new device credentials based at least on the merged credentials policy and a seed that is known to the trusted service.

19. The computer-readable storage device of claim 15, wherein said generating comprises:
generating the new device credentials to have an associated active lifespan.

20. The computer-readable storage device of claim 15, further comprising:
receiving an access request from a user attempting to access the user device; and
requiring the user to provide at least the new device credentials to be enabled to access to the user device.

* * * * *